A. SMITH.
HARROW ATTACHMENT.
APPLICATION FILED AUG. 17, 1911.
1,076,070.
Patented Oct. 21, 1913.
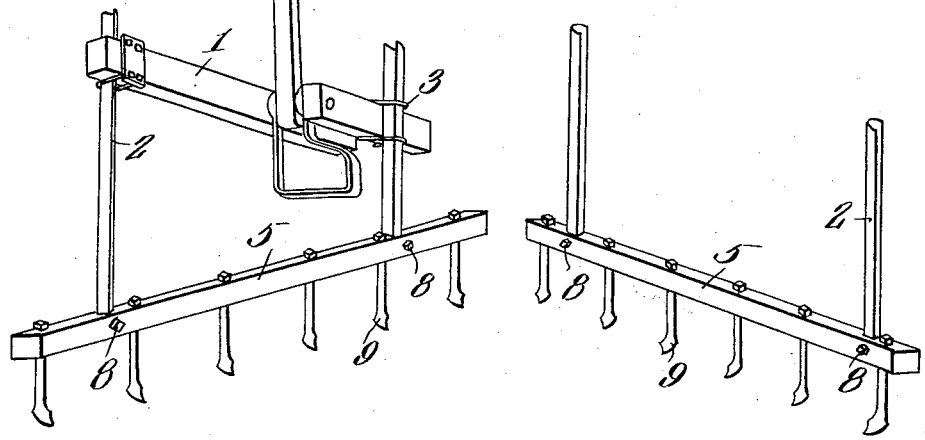
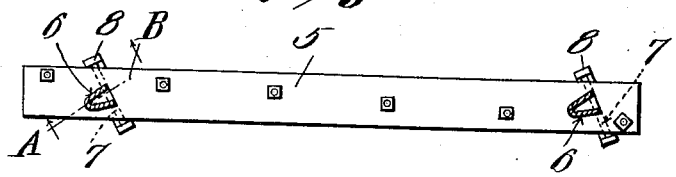
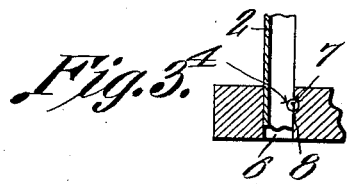
Witnesses
A. Smith,
Inventor
by C.A. Snow & Co.
Attorneys

UNITED STATES PATENT OFFICE.

ALEXANDER SMITH, OF GOLIAD, TEXAS.

HARROW ATTACHMENT.

1,076,070. Specification of Letters Patent. Patented Oct. 21, 1913.

Application filed August 17, 1911. Serial No. 644,572.

*To all whom it may concern:*

Be it known that I, ALEXANDER SMITH, a citizen of the United States, residing at Goliad, in the county of Goliad and State of Texas, have invented a new and useful Harrow Attachment, of which the following is a specification.

This invention relates to harrow attachments for cultivators, one of its objects being to provide a simple form of attachment which can be readily placed upon the standards of the cultivator plows or shovels, the said standards being engaged by the end portions of the attachment and being adapted to hold said attachment fixedly in any desired position relative to the structure of the cultivator.

A further object is to provide a harrow attachment of this character which is efficient and durable, is cheap to manufacture, and can be readily placed on or removed from a cultivator.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings: Figure 1 is a perspective view of a portion of a cultivator having harrow attachments combined therewith. Fig. 2 is a plan view of one of the harrow attachments, the standards being shown in section. Fig. 3 is an enlarged section on line A—B Fig. 2. Fig. 4 is a perspective view of the lower end portion of one of the standards.

Referring to the figures by characters of reference, 1 designates a portion of a cultivator structure, said structure having the ordinary plow or shovel standards 2 connected thereto by means of U-bolts or the like, these standards being preferably formed of channeled material and substantially V-shaped in cross section. The lower end of each standard has notches 4 formed in the edges thereof for the reception of a clip designed to hold a cultivator shovel or plow to the standard. The standards, in the form of the device shown in Fig. 1, are arranged in pairs and the lower ends of the standards of each pair are adapted to be placed in engagement with the ends of one of the attachments constituting the present invention. Each attachment is made up of a beam 5 preferably of wood although it can be made of metal if preferred, and formed within each beam near its ends, are openings 6 corresponding in transverse contour to the standards 2 so that said standards can be inserted into the openings and will fit snugly therein. The openings are disposed obliquely within the beam 5 so that the standards can be inserted readily into them. Openings 7 extend obliquely through each beam from one side to the other thereof and communicate with the openings 6, these openings 7 being adapted to receive locking bolts 8 which, when inserted into the openings 7, also become seated within the notches 4 which are formed in those portions of the standards located within the openings 6. With the bolts 8 thus in engagement with the standards, it will be apparent that the beam 5 will be securely keyed to the standards and cannot become accidentally displaced therefrom.

Each beam 5 is provided with a series of harrow teeth 9, preferably of the form shown in the drawings. These teeth can be disposed in any desired relation within the beam 5, but are preferably arranged along a diagonal line extending throughout the length of the beam and as shown in Fig. 2.

It will be apparent that by providing a harrow attachment such as has been described, the same can be made very cheaply and can be quickly applied to the standards of a cultivator simply by removing the shovels or plows and then slipping the bar 5 onto the lower ends of the standards 2 and securing the bar to the standards by means of the bolts 8. It is not necessary to remove the standards 2 or to provide specially constructed standards.

It is to be understood of course that the beam 5 can be adjusted longitudinally of the standards 2 by removing the bolt 8 and re-inserting them in other notches formed within the standards. Or, if preferred, the standards 2 can be adjusted vertically thus moving the bar 5 therewith.

What is claimed is:—

The combination with a cultivator beam, of an attachment including a beam having an obliquely disposed opening extending therethrough from the top to the bottom thereof adjacent each end, substantially V-shaped standards seated in the openings and extending upwardly therefrom, means for detachably and adjustably securing the said standards to the first mentioned beam, those portions of the standards within the openings being provided with transverse notches in the longitudinal edges thereof, obliquely disposed bolts extending through the apertured beam and intersecting the openings therein, said bolts being seated in the notches to hold the beam against movement on the standards, said bolt operating to prevent the beam from splitting adjacent the openings, and a series of harrow teeth separate from the standards and depending from and extending diagonally across the apertured beam.

In testimony that I claim the foregoing as my own, I have hereto affixed my signature in the presence of two witnesses.

ALEXANDER SMITH.

Witnesses:
J. O. BERRYMAN,
J. C. BURNS.

Copies of this patent may be obtained for five cents each, by addressing the "Commissioner of Patents, Washington, D. C."